US008769339B2

(12) United States Patent
Sonoda et al.

(10) Patent No.: US 8,769,339 B2
(45) Date of Patent: Jul. 1, 2014

(54) APPARATUS AND METHOD FOR MANAGING NETWORK SYSTEM

(75) Inventors: Masataka Sonoda, Kawasaki (JP); Yuji Wada, Kawasaki (JP); Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 12/985,019

(22) Filed: Jan. 5, 2011

(65) Prior Publication Data

US 2011/0173500 A1 Jul. 14, 2011

(30) Foreign Application Priority Data

Jan. 12, 2010 (JP) ................................ 2010-004389

(51) Int. Cl.
*G06F 11/00* (2006.01)

(52) U.S. Cl.
USPC .......................................................... 714/26

(58) Field of Classification Search
USPC .......................................................... 714/26
See application file for complete search history.

(56) References Cited

U.S. PATENT DOCUMENTS

| | | | | |
|---|---|---|---|---|
| 6,006,016 A | * | 12/1999 | Faigon et al. | 714/48 |
| 6,012,152 A | * | 1/2000 | Douik et al. | 714/26 |
| 6,604,208 B1 | * | 8/2003 | Gosselin et al. | 714/4.12 |
| 7,043,661 B2 | * | 5/2006 | Valadarsky et al. | 714/4.1 |
| 7,259,666 B1 | * | 8/2007 | Hermsmeyer et al. | 340/517 |
| 7,568,126 B2 | * | 7/2009 | Brethereau et al. | 714/26 |
| 7,631,222 B2 | * | 12/2009 | Hasan et al. | 714/26 |
| 2007/0220330 A1 | * | 9/2007 | Nauerz et al. | 714/26 |
| 2010/0318847 A1 | * | 12/2010 | Beg et al. | 714/26 |

FOREIGN PATENT DOCUMENTS

| | | |
|---|---|---|
| JP | 02-244338 A | 9/1990 |
| JP | 06-324904 A | 11/1994 |
| JP | 2000-20428 A | 1/2000 |
| JP | 2001-222442 A | 8/2001 |
| JP | 2004-62741 A | 2/2004 |
| JP | 2008-41041 A | 2/2008 |
| JP | 2010-231420 A | 10/2010 |

* cited by examiner

*Primary Examiner* — Philip Guyton
(74) *Attorney, Agent, or Firm* — Fujitsu Patent Center

(57) ABSTRACT

An apparatus for managing a network system including a plurality of components, the apparatus includes a memory that stores component type data of each component of the plurality of components, component relation data including relation information indicating a pair of components related to each other in the network system and error history data including error information of respective error components in the plurality of components. The apparatus includes a processor that executes a procedure including extracting a pair of component type data as a relation class candidate on the basis of the component type data of a pair of error components indicated by the error information in the error history data, the pair of error components being indicated by the relation information.

13 Claims, 16 Drawing Sheets

FIG. 7

```
<cmdb>
   <Cis>
      <CI id="pm11" item="PM" />
      <CI id="pm12" item="PM" />
      <CI id="pm13" item="PM" />
      <CI id="va01" item="VM" />
       . . . .
      <CI id="Tb" item="Service" />
   </Cis>
   <Relations>
      <Relation id="rel01" src="va01" dst="pm11" type="vm-pm"/>
      <Relation id="rel02" src="pm11" dst="va01" type="pm-vm"/>
       . . . .
      <Relation id="rel24" src="vb01" dst="Tb" type="tenant-vm"/>
   </Relations>
</cmdb>
```

FIG. 8

| ERROR ID | OCCURRENCE TIME | DETECTED POINT | | ERROR |
|---|---|---|---|---|
| | | ci_id | CI TYPE | ERROR DETAILS |
| 01 | 07/01/09 00:01:30 | pm11 | PM | ping timeout |
| 02 | 07/01/09 00:01:40 | va01 | VM | ping timeout |
| 03 | 07/01/09 00:02:00 | Ta | Svc | service error |
| | ... | ... | ... | ... |

FIG. 9

| | PROPAGATION SOURCE ERROR | | PROPAGATION DESTINATION ERROR | | DIRECTION OF RELATION |
|---|---|---|---|---|---|
| | CI TYPE | ERROR TYPE | CI TYPE | ERROR TYPE | |
| rel02 | PM | ping timeout | VM | ping timeout | PROPAGATION SOURCE → PROPAGATION DESTINATION |
| rel06 | PM | ping timeout | VM | ping timeout | PROPAGATION SOURCE → PROPAGATION DESTINATION |
| rel13 | VM | ping timeout | Svc | service error | PROPAGATION SOURCE → PROPAGATION DESTINATION |
| rel01 | VM | ping timeout | PM | ping timeout | PROPAGATION DESTINATION → PROPAGATION SOURCE |
| ... | ... | ... | ... | ... | ... |

FIG. 10

| | PROPAGATION SOURCE ERROR | | PROPAGATION DESTINATION ERROR | | DIRECTION OF RELATION | NUMBER OF APPEARANCES |
|---|---|---|---|---|---|---|
| | CI TYPE | ERROR TYPE | CI TYPE | ERROR TYPE | | |
| c01 | PM | ping timeout | VM | ping timeout | PROPAGATION SOURCE → PROPAGATION DESTINATION | 10 |
| c02 | VM | ping timeout | Svc | app error | PROPAGATION SOURCE → PROPAGATION DESTINATION | 8 |
| c03 | VM | cpu overload | Svc | slowdown | PROPAGATION SOURCE → PROPAGATION DESTINATION | 7 |
| c04 | VM | cpu overload | VM | app slowdown | PROPAGATION SOURCE → PROPAGATION DESTINATION | 5 |
| c05 | VM | request burst | PM | nw overload | PROPAGATION DESTINATION → PROPAGATION SOURCE | 5 |

FIG. 11

| id | src CI TYPE | tgt CI TYPE |
|---|---|---|
| c01 | PM | VM |
| c02 | VM | Svc |
| c03 | VM | Svc |
| c04 | VM | VM |
| c05 | VM | PM |

FIG. 12

| RELATION | APPLIED CLASS |
|---|---|
| rel01 | c05 |
| rel02 | c01 |
| rel03 | c01 |
| rel04 | c05 |
| ... | ... |
| rel19 | c04 |
| rel20 | c04 |
| ... | ... |
| rel23 | c02, c03 |
| rel24 | c02, c03 |

FIG. 13

```
<cmdb>
  <Cis>
    <CI id="pm11" item="PM" />
    <CI id="pm12" item="PM" />
    <CI id="pm13" item="PM" />
    <CI id="va01" item="VM" />
    ....
    <CI id="Tb" item="Service" />
  </Cis>
  <Relations>
    <Relation id="rel01" src="va01" dst="pm11" type="vm-pm"
      class="c05"/>
    <Relation id="rel02" src="pm11" dst="va01" type="pm-vm"
      class="c01"/>
    ....
    <Relation id="rel24" src="vb01" dst="Tb" type="tenant-vm"
      class="c02,c03"/>
  </Relations>
</cmdb>
```

FIG. 14

| id | ERROR CLASS | | CAUSE FAILURE POINT | HANDLING | SORTING PATH |
|---|---|---|---|---|---|
| | CI | ERROR TYPE | | | |
| c01 | Ta | service error | pm12 | XX | rel14 → rel06 |
| c02 | Tb | service error | vb02 | YY | rel17 |

FIG. 15

| id | ERROR | | CAUSE FAILURE POINT TYPE | SORTING PATH CLASS |
|---|---|---|---|---|
| | CI TYPE | ERROR TYPE | | |
| 01 | Svc | service error | PM | c02+c03→c01 |
| | | | VM | c02+c03 |
| ... | ... | ... | ... | ... |

FIG. 16

| SYMPTOM DETECTED CI | SYMPTOM TYPE |
|---|---|
| Ta | service error |

APPARATUS AND METHOD FOR MANAGING NETWORK SYSTEM

CROSS-REFERENCE TO RELATED APPLICATION

This application is based upon and claims the benefit of priority of the prior Japanese Patent Application No. 2010-004389 filed on Jan. 12, 2010, the entire contents of which are incorporated herein by reference.

FIELD

The embodiments discussed herein are related to an apparatus and a method for managing a network system.

BACKGROUND

Hitherto, when an error occurs in a large-scale system having many components, locating its cause has been desirable. It is desirable that a matrix of correlations between components of a system is created, and when an error occurs, the cause is located with reference to the matrix.

However, the technology in the past that creates a matrix of correlations for each system may desire recreation of a matrix every time its system configuration changes. In a system immediately after changed, less error information is available. Thus, locating a cause of an error may not be available if any with reference to the matrix. When identifying a cause with reference to the matrix is not available, an operator may be desirable to manually classify the trouble and as a result increase its man-hours.

With the increases in scale of systems, an environment of a virtualized system, what is called a cloud environment has been increasingly used. One of advantages of a virtualized system is that its system configuration may be dynamically changed without influences on its services. Thus, the technology allowing support for location of a cause of an error if occurs even after the system configuration is changed is particularly desirable upon trouble investigation in the virtual environment.

In this way, it is desirable for technologies in the past to provide a sufficient support for trouble investigation in a large-scale system or virtual environment, and the implementation of a technology for supporting trouble investigation has been a desired goal.

SUMMARY

According to an aspect of an embodiment, an apparatus for managing a network system including a plurality of components, the apparatus includes a memory that stores component type data of each component of the plurality of components, component relation data including relation information indicating a pair of components related to each other in the network system and error history data including error information of respective error components in the plurality of components, and a processor that executes a procedure including extracting a pair of component type data as a relation class candidate on the basis of the component type data of a pair of error components indicated by the error information in the error history data, the pair of error components being indicated by the relation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an explanatory diagram of a concrete example of configuration information;

FIG. 8 is an explanatory diagram of a concrete example of an error history;

FIG. 9 is an explanatory diagram regarding combinations of components extracted by a classification unit;

FIG. 10 is a diagram of a relation class candidate list generated by the classification unit;

FIG. 11 is a diagram illustrating the types of CIs serving as sources and targets of determined relation classes;

FIG. 12 is an explanatory diagram of relations and relation classes to apply;

FIG. 13 is an explanatory diagram of configuration information after the relation classes are applied;

FIG. 14 is an explanatory diagram regarding a concrete example of failure handling information;

FIG. 15 is a diagram of a concrete example of investigation details generated by an investigation detail generating unit;

FIG. 16 is an explanatory diagram of a concrete example of error detection information;

DESCRIPTION OF EMBODIMENTS

Embodiments of a network management supporting system, a network management supporting apparatus, a network management supporting method, and a program disclosed in the subject application will be described in detail below with reference to the drawings. The embodiments do not limit the disclosed art.

Figure 1:
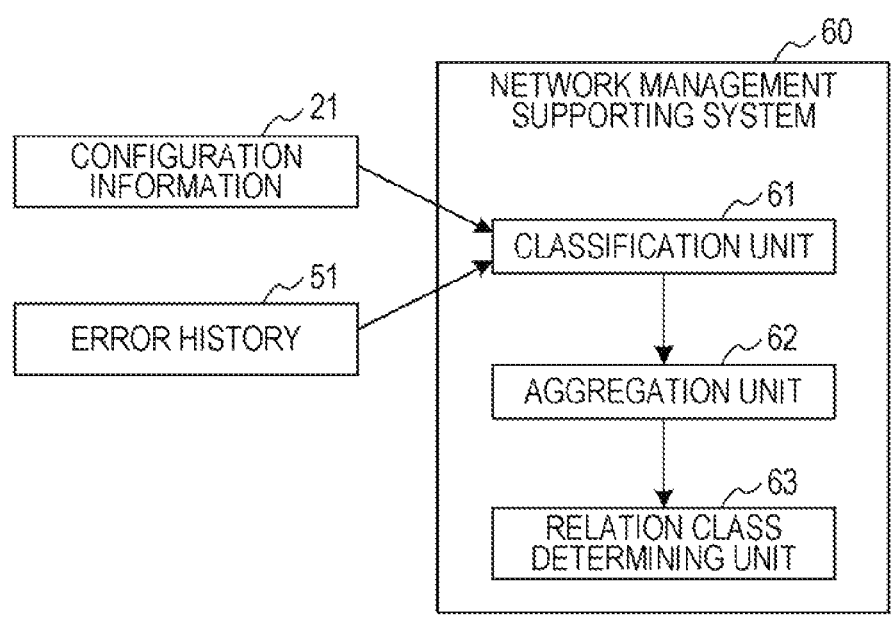
FIG. 1 is a schematic configuration diagram of a network management supporting system according to a first embodiment.

FIG. 1 is a schematic configuration diagram of a network management supporting system according to a first embodiment. A network management supporting system 60 illustrated in FIG. 1 includes a classification unit 61, an aggregation unit 62, and a relation class determining unit 63. The network management supporting system 60 is configured with a computer system including a processor and a memory.

The classification unit 61, an aggregation unit 62, and a relation class determining unit 63 are realized by causing the processor to execute a managing operation program. The failure managing operation program may be recorded in a computer readable non-transitory medium such as a semiconductor memory, a hard disk, a flexible disk (FD), a CD-ROM, an MO and a DVD.

The classification unit 61 refers to configuration information 21 indicating relations provided among the components of a network, and an error history 51 that is history information of errors occurring in the components, and extracts a combination of two components where errors are occurring and which have a relation. For the extracted combination of components, the classification unit 61 classifies the type of a component serving as a source of the combination and the type of a component serving as a target of the combination as candidates for a relation class indicating the relationship between components where an error is propagating. The configuration information 21 and error history 51 are stored in a memory of the network management supporting system 60. The memory includes not only a semiconductor memory but also a storage medium such as an electromagnetic tape, a hard disk, a FD, a CD-ROM, an MO and a DVD. Moreover, the configuration information 21 and error history 51 are stored in a plurality of memories of the network management supporting system 60.

The aggregation unit 62 aggregates the results of classifications performed by the classification unit 61. Then, the aggregation unit 62 obtains the number of appearances of each candidate for a relation class. Based on the results of aggregation performed by the aggregation unit 62, the relation class determining unit 63 determines, among the candidates for a relation class, a relation class to be used in estimating a point causing an error that occurs in the network.

The relation class determined in this manner indicates the propagating direction of an error between the components. Thus, when an error occurs in components of a network, the point where a failure causing the error has occurred may be estimated by tracking a relation class from the components in which the error is occurring.

As described above, the network management supporting system according to the first embodiment can support trouble investigation in a system by generating a relation class that is abstraction of the propagating direction of an error based on the types of components of a network, from configuration information of the network and error history information.

Narrowing down the possible points of a failure using a relation class does not depend on the configuration of a network system and is thus highly versatile. Therefore, such a technique is applicable to a newly configured network system and even to a network system having a changed configuration.

Trouble investigation in a large-scale network system or a virtual environment may be supported by narrowing down the possible points of a failure.

Figure 2:
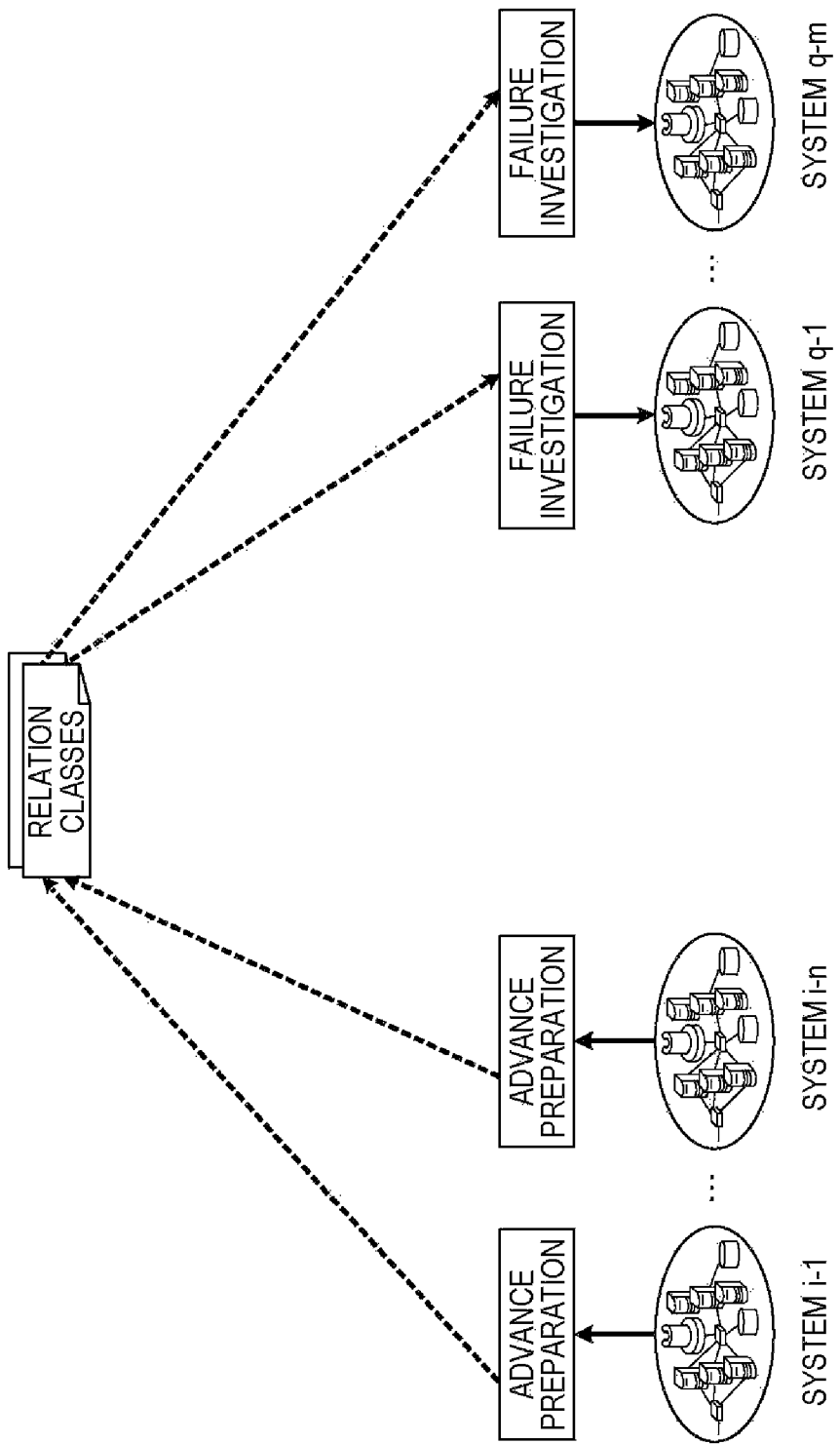
FIG. 2 is an explanatory diagram regarding the use of relation classes among different systems.

FIG. 2 is an explanatory diagram regarding the use of relation classes among different systems. As illustrated in FIG. 2, relation classes are generated, from systems i_1 to i_n, as advance preparations. The relation classes may be used when a failure occurs in other systems o_1 to o_m to estimate the point where the failure has occurred in the systems o_1 to o_m.

The classification unit 61, the aggregation unit 62, and the relation class determining unit 63 may be arranged in a dispersed manner over the network system. Alternatively, a network management supporting apparatus including the classification unit 61, the aggregation unit 62, and the relation class determining unit 63 that are arranged in a single housing may be implemented.

Figure 3:
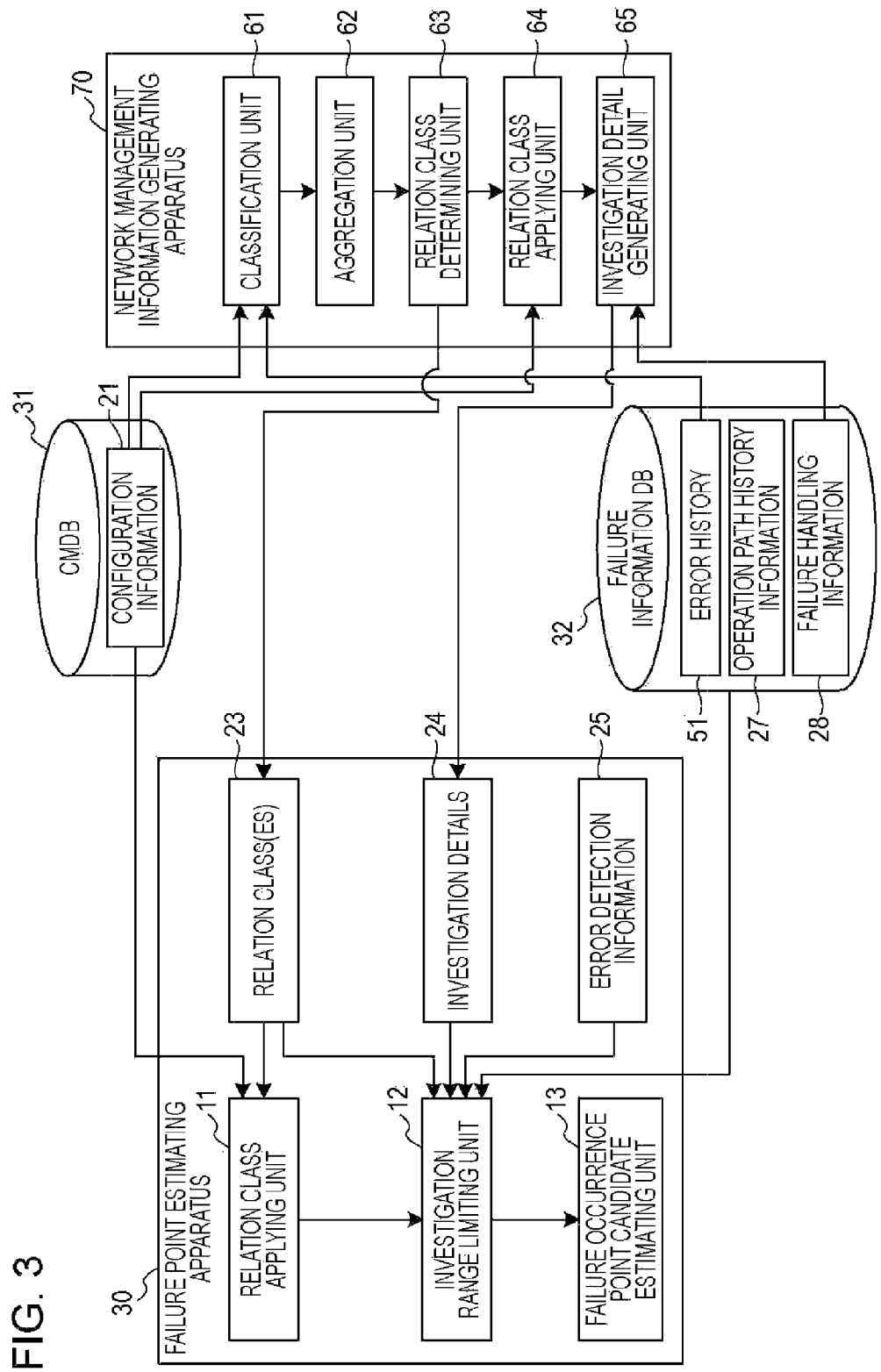
FIG. 3 is a schematic configuration diagram of a network management supporting system according to a second embodiment.

FIG. 3 is a schematic configuration diagram of a network management supporting system according to a second embodiment. The network management supporting system illustrated in FIG. 2 includes a network management information generating apparatus 70, a failure point estimating apparatus 30, a configuration management database (CMDB) 31, and a failure information database (DB) 32. The failure point estimating apparatus 30 is configured with a computer system including a processor and a memory. The relation class applying unit 11, an investigation range limiting unit 12, and a failure position candidate estimating unit 13 are realized by causing the processor to execute a failure position estimation program.

The CMDB 31 holds the configuration information 21 which is information indicating relationships among the components of a network. The failure information DB 32 is a database that holds the error history 51 indicating the history of errors that have occurred in the past and a history of relations tracked when errors have occurred in the past. The failure information DB 32 holds, as an example of a history of relations tracked when errors have occurred in the past, operation path history information 27 and failure handling information 28.

The operation path history information 27 is information indicating a path of relations tracked for specifying the point of a failure causing an error that has occurred in the past. The failure handling information 28 includes path information from the component in which an error has been detected to the component specified as the cause of the error.

The network management information generating apparatus 70 includes the classification unit 61, the aggregation unit 62, the relation class determining unit 63, a relation class applying unit 64, and an investigation detail generating unit 65.

The classification unit 61 refers to the configuration information 21 held in the CMDB 31 and the error history 51 held in the failure information DB 32, and extracts a combination of two components where errors are occurring and which have a relation. For the extracted combination of components, the classification unit 61 classifies the type of a component serving as a source of the combination and the type of a component serving as a target of the combination as candidates for a relation class indicating the relationship between components where an error is propagating.

The aggregation unit 62 aggregates the results of classifications performed by the classification unit 61. Then, the aggregation unit 62 obtains the number of appearances of each candidate for a relation class. Based on the results of aggregation performed by the aggregation unit 62, the relation class determining unit 63 determines, among the candidates for a relation class, a relation class (relation classes) 23 to be used in estimating a point causing an error that occurs in the network, and outputs the relation class (relation classes) 23 to the failure point estimating apparatus 30.

The relation class applying unit 64 performs abstraction by applying a relation class (relation classes) to the configuration information 21 held in the CMDB 31. The investigation detail generating unit 65 generates investigation details to be associated with a relation class (relation classes) that may be tracked for the type of error. Specifically, the investigation detail generating unit 65 refers to the failure handling information 28, which is a handling history for specifying the path from a component in which an error has occurred to a component in which a failure causing the error has occurred, applies a relation class (relation classes) to the path indicated in the handling history, and thus obtains the result as investigation details 24. The investigation detail generating unit 65 outputs the generated investigation details 24 to the failure point estimating apparatus 30.

The failure point estimating apparatus 30 includes a relation class applying unit 11, an investigation range limiting unit 12, and a failure occurrence point candidate estimating unit 13. The failure point estimating apparatus 30 uses the relation class (relation classes) 23, the investigation details 24, and error detection information 25. The error detection information 25 is information obtained as a result of detection of a component having an error and the type of the error among the components of a network system. The relation class (relation classes) 23, the investigation details 24 and the error detection information 25 is stored in a storage unit of the failure point estimating apparatus 30.

The relation class applying unit 11 refers to the configuration information 21 and the relation class (relation classes) 23 to apply the relation class (relation classes) to the relationship between components included in the configuration information 21.

The investigation range limiting unit 12 refers to the relation class (relation classes) 23, the investigation details 24, the error detection information 25, and the failure information DB 32 to obtain, as an investigation-range-limited tree, components and a relation (relations) tracked in accordance with the investigation details 24 for each component having an error.

The failure occurrence point candidate estimating unit 13 superimposes investigation-range-limited trees as an example of an investigation range, obtained for the individual components having errors and estimates candidates for the point where a failure causing the errors has occurred.

Figure 4:
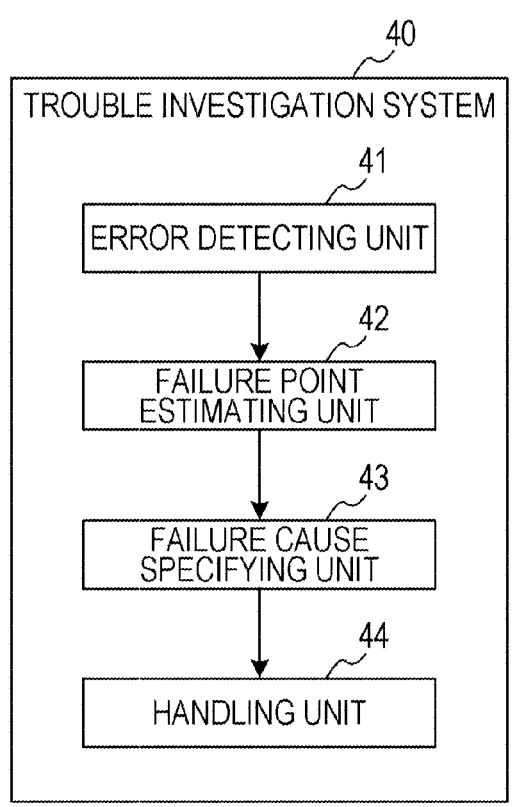
FIG. 4 is a schematic configuration diagram of a trouble investigation system that investigates a failure occurring in a network.

FIG. 4 is a schematic configuration diagram of a trouble investigation system that investigates a failure occurring in a network. A trouble investigation system 40 illustrated in FIG. 4 has an error detecting unit 41, a failure point estimating unit 42, a failure cause specifying unit 43, and a handling unit 44. The failure point estimating apparatus 30 illustrated in FIG. 3 functions as the failure point estimating unit 42.

The error detecting unit 41 is a processor that detects an error occurring in a component of a network and notifies the failure point estimating unit 42 of the detected error. The failure point estimating apparatus 30 functioning as the failure point estimating unit 42 uses the information provided in the notification as the error detection information 25. The failure point estimating apparatus 30 functioning as the failure point estimating unit 42 estimates candidates for the point where the failure causing the error has occurred and outputs the candidates to the error cause specifying unit 43.

The error cause specifying unit 43 uses the output from the failure point estimating unit 42 to specify the cause of the error. The handling unit 44 handles the specified point so as to overcome the error that has occurred.

Figure 5:
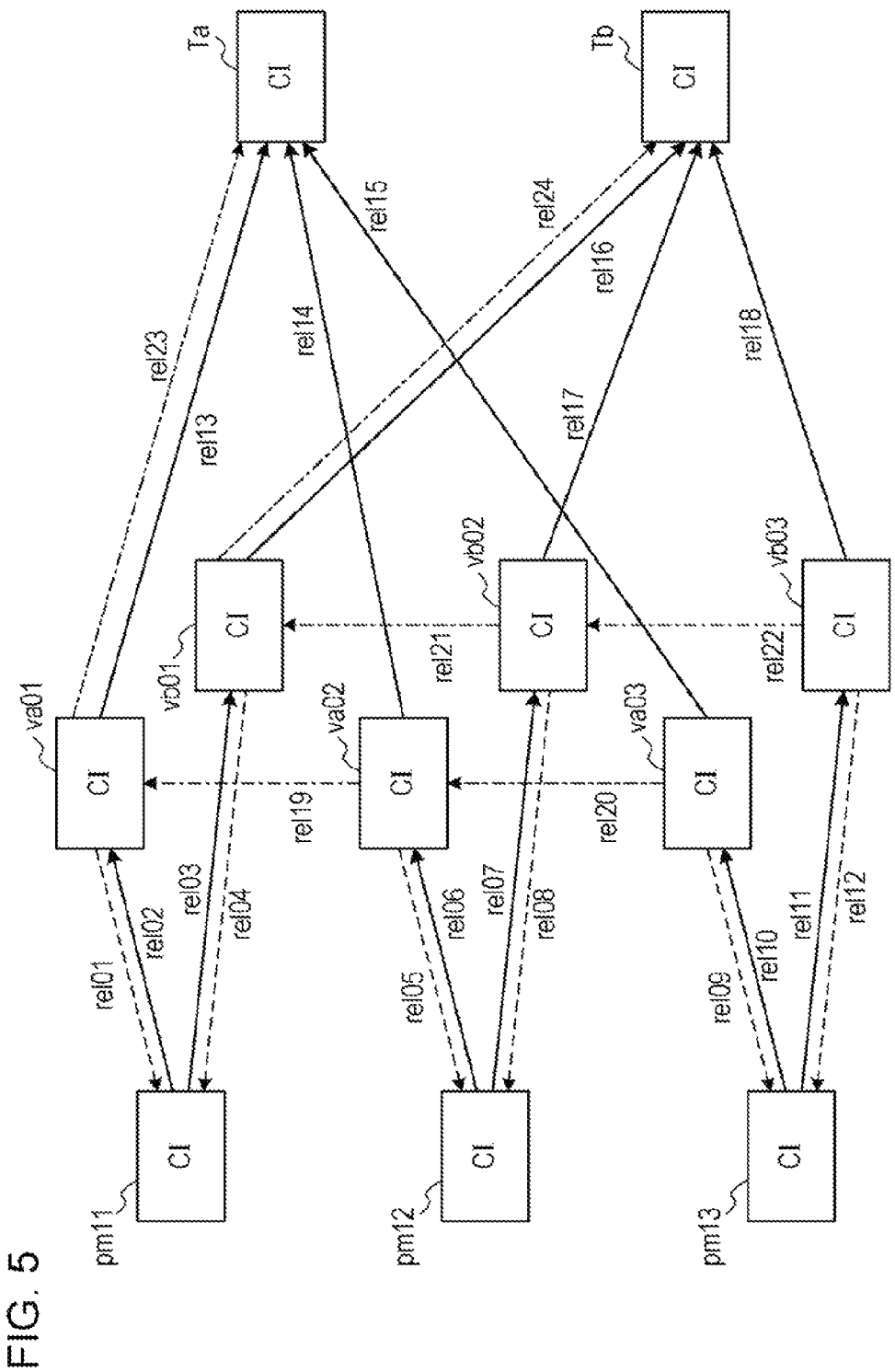
FIG. 5 is an explanatory diagram of an example of the configuration of a network.

FIG. 5 is an explanatory diagram of an example of the configuration of a network. The network illustrated in FIG. 5 includes configuration items (CIs) pm11 to pm13, CIs va01 to va03, CIs vb01 to vb03, a CI Ta, and a CI Tb as components.

The network illustrated in FIG. 5 is a virtual network including the CIs pm11 to pm13 as physical machines, the CIs va01 to va03 and the CIs vb01 to vb03 as virtual machines, and the CIs Ta and Tb as services. Each of the CIs may be one computer, or plural CIs may operate on one computer. Each of the CIs is given identification information uniquely defined in the network and may operate as an individual component. Information for identifying a CI is called an "instance".

A relation is defined between CIs. This relation between the CIs is called a "relation". A direction is defined for a relation, and the origin of the relation is called a "source (src)" and the destination of the relation is called a "target (tgt)" or a "destination (dst)".

In the network illustrated in FIG. 5, relations rel01 to rel24 are defined. The relation rel01 has the CI va01 as its source and the CI pm11 as its target. The relation rel02 has the CI pm11 as its source and the CI va01 as its target. The relation rel03 has the CI pm11 as its source and the CI vb01 as its target. The relation rel04 has the CI vb01 as its source and the CI pm11 as its target. The relation rel05 has the CI va02 as its source and the CI pm12 as its target. The relation rel06 has the CI pm12 as its source and the CI va02 as its target. The relation rel07 has the CI pm12 as its source and the CI vb02 as its target. The relation rel08 has the CI vb02 as its source and the CI pm12 as its target. The relation rel09 has the CI va03 as its source and the CI pm13 as its target. The relation rel10 has the CI pm13 as its source and the CI va03 as its target. The relation rel11 has the CI pm13 as its source and the CI vb03 as its target. The relation rel12 has the CI vb03 as its source and the CI pm13 as its target. The relation rel13 has the CI va01 as its source and CI Ta as its target. The relation rel14 has the CI va02 as its source and the CI Ta as its target. The relation rel15 has the CI va03 as its source and the CI Ta as its target. The relation rel16 has the CI vb01 as its source and the CI Tb as its target. The relation rel17 has the CI vb02 as its source and the CI Tb as its target. The relation rel18 has the CI vb03 as its source and the CI Tb as its target. The relation rel19 has the CI va02 as its source and the CI va01 as its target. The relation rel20 has the CI va03 as its source and the CI va02 as its target. The relation rel21 has the CI vb02 as its source and the CI vb01 as its target. The relation rel22 has the CI vb03 as its source and the CI vb02 as its target. The relation rel23 has the CI va01 as its source and the CI Ta as its target. The relation rel24 has the CI vb01 as its source and the CI Tb as its target.

In the network, the CI Ta and the CI Tb are accessed by clients (not illustrated) and provide certain services to the clients. The CI va01, which is a virtual machine, is responsible for a web layer of a service provided by the CI Ta. The CI va02, which is a virtual machine, is responsible for an application layer of a service provided by the CI Ta. The CI va03, which is a virtual machine, is responsible for a database layer of a service provided by the CI Ta.

Similarly, the CI vb01, which is a virtual machine, is responsible for a web layer of a service provided by the CI Tb. The CI vb02, which is a virtual machine, is responsible for an application layer of a service provided by the CI Tb. The CI vb03, which is a virtual machine, is responsible for a database layer of a service provided by the CI Tb.

The CI va01 and the CI vb01, which are virtual machines responsible for a web layer, use the CI pm11, which is a physical machine. The CI va02 and the CI vb02, which are virtual machines responsible for an application layer, use the CI pm12, which is a physical machine. The CI va03 and the CI vb03, which are virtual machines responsible for a database layer, use the CI pm13, which is a physical machine.

When an error occurs in this network, the failure point estimating apparatus 30 generates investigation-range-limited trees by tracking relations from the CIs in which the error has been detected, superimposes the investigation-range-limited trees, and estimates candidates for the point where a failure causing the error has occurred.

Figure 6:
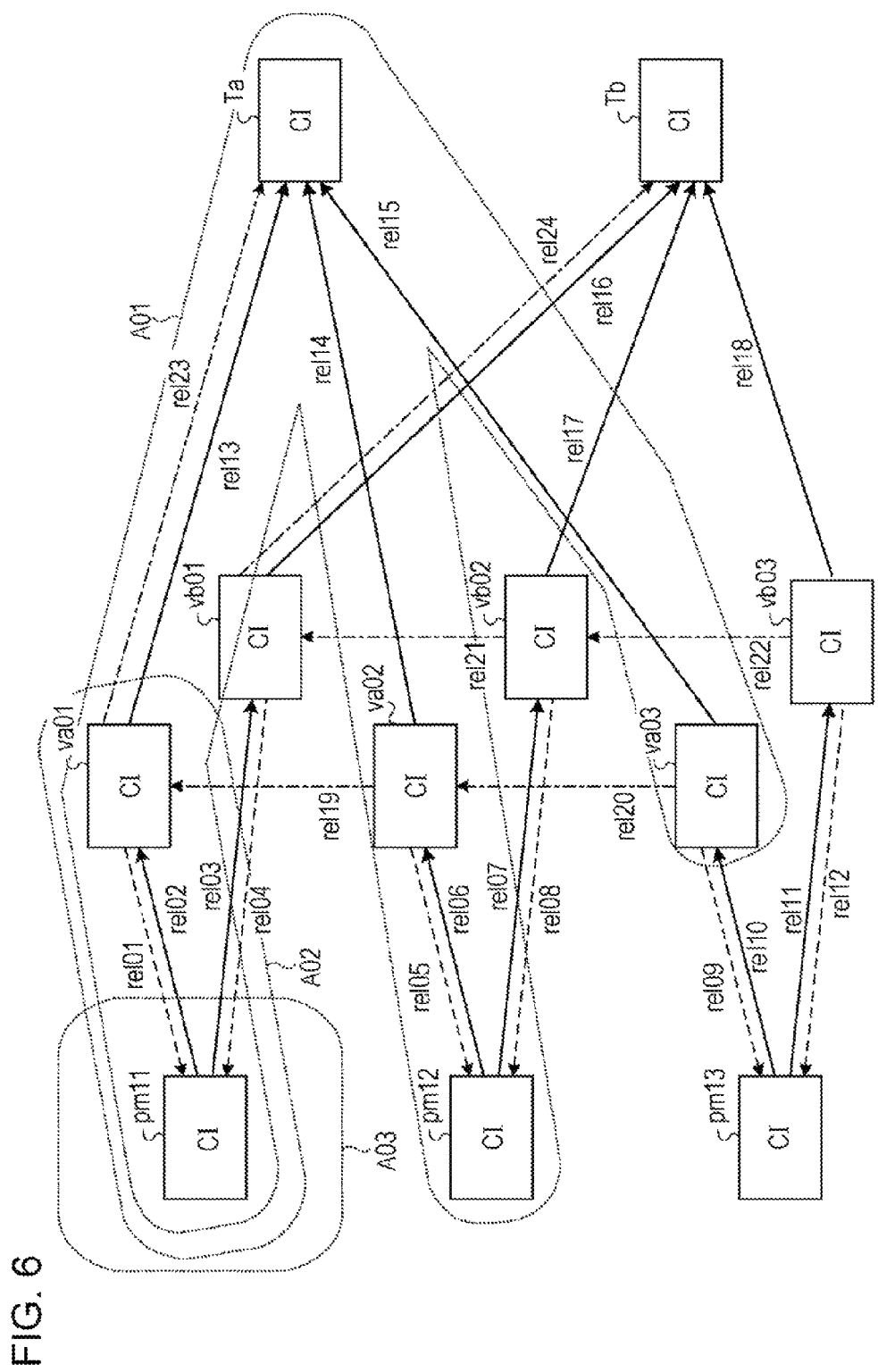
FIG. 6 is an explanatory diagram regarding the superimposition of investigation-range-limited trees.

FIG. 6 is an explanatory diagram regarding the superimposition of investigation-range-limited trees. FIG. 6 illustrates an example of the case in which an error has been detected in the CI Ta, the CI va01, and the CI pm11. The failure point estimating apparatus 30 generates an investigation-range-limited tree A01 by tracking relations from the CI Ta. The investigation-range-limited tree A01 has a root in the CI Ta and the CI va01 to va03 as nodes connecting to the CI Ta. The investigation-range-limited tree A01 further has the CI pm11 as a node connecting to the CI va01 and the CI pm12 as a node connecting to the CI va02. Here, the investigation-range-limited tree A01 does not include the CI pm13. This is because an excessive increase in size of the investigation-range-limited trees may be prevented by limiting the range of relations to be tracked for generating the investigation-range-limited trees. The range of relations to be tracked for generating investigation-range-limited trees may be limited by defining its hop values and attenuation levels. The hop values and attenuation levels will be described later.

The failure point estimating apparatus 30 generates an investigation-range-limited tree A02 by tracking relations from the CI va01. The investigation-range-limited tree A02 has a root in the CI va01 and the CI pm11 as a node connecting to the CI va01.

The failure point estimating apparatus 30 generates an investigation-range-limited tree A03 by tracking relations from the CI pmn11. In the example illustrated in FIG. 5, no relations may be tracked from the CI pmn11, and the investigation-range-limited tree A03 only has the CI pm11.

The failure point estimating apparatus 30 superimposes the investigation-range-limited trees A01 to A03 and estimates the CI pmn11 with maximum superimposition as a candidate for the point where the failure has occurred.

FIG. 7 is an explanatory diagram of a concrete example of the configuration information 21. The configuration information 21 illustrated in FIG. 7 has a Cis tag that defines CIs and a Relations tag that defines relations within a cmdb tag. The Cis tag contains descriptions of ids and types of CIs.

The example illustrated in FIG. 7 includes the CIs pmn11 to pm13, the CI va01, and the CI Tb within the Cis tag. The CIs pmn11 to pm13 are each associated with "PM" indicating that its type is a physical machine. Similarly, the CI va01 is associated with "VA" indicating that its type is a virtual machine. The CI Tb is associated with "Service" indicating that its type is a service.

The example illustrated in FIG. 7 has relations rel01, rel02, and rel24 within the Relations tag. The relation rel01 has the va01 as its source src and the pm11 as dst corresponding to the target and is associated with "vm-pm" as a type indicating a combination of the types of the source and target. The relation rel02 has the pmn11 as its source src and the va01 as dst corresponding to the target and is associated with "pm-vm" as a type indicating a combination of the types of the source and target. The relation rel24 has the vb01 as its source src and the Tb as dst corresponding to the target and is associated with "tenant-vm" as a type indicating a combination of the types of the source and target.

FIG. 8 is an explanatory diagram of a concrete example of the error history 51. The error history 51 has items including an error id, occurrence time, detected point, and error details. The error id is information to be used in identifying an entry of the error history 51. The occurrence time indicates the time at which an error has occurred. The detected point has identification information of a CI in which an error has occurred and information indicating the type of the CI. The error details indicate the details of an error that has occurred.

In the example illustrated in FIG. 8, an entry having 01 as an error id indicates that on Jul. 1, 2009, 00:01:30, a ping timeout error has occurred at the instance pm11 whose CI type is PM. Similarly, an entry having 02 as an error id indicates that on Jul. 1, 2009, 00:01:40, a ping timeout error has occurred at the instance va01 whose CI type is VM. An entry having 03 as an error id indicates that on Jul. 1, 2009, 00:02:00, a service error has occurred at the instance Ta whose CI type is Svc.

FIG. 9 is an explanatory diagram regarding combinations of components extracted by the classification unit 61. The classification unit 61 selects two errors from the error history 51. When a relation has been set in components having the selected two errors, a component having an error whose occurrence time is earlier is regarded as a component serving as the propagation source of an error, and a component having an error whose occurrence time is later is regarded as a component serving as the propagation destination of the error. The classification unit 61 checks, for example, combinations of all errors indicated in the error history 51 to determine whether a relation has been set in two combined components having errors. Alternatively, the classification unit 61 may check combinations of two errors whose occurrence times have a difference that is less than or equal to a certain time to determine whether a relation has been set in two components having the errors.

In the example illustrated in FIG. 9, with regard to a relation between two extracted components, correlations among the type of a CI serving as the propagation source, the type of an error that has occurred, the type of a CI serving as the propagation destination of an error, the type of an error that has occurred, the direction of the relation, and the propagating direction of the error are illustrated.

In the relation rel02, a CI serving as the propagation source is PM, and its error type is ping timeout; and a CI serving as the propagation destination is VM, and its error type is ping timeout. The direction of the relation rel02 is from the propagation source to the propagation direction. That is, it is indicated that, after a ping timeout occurs in the CI whose type is PM, which is the source of the relation rel02, a ping timeout occurs in the CI whose type is VM, which is the target of the relation rel02.

In the relation rel06, a CI serving as the propagation source is PM, and its error type is ping timeout; and a CI serving as the propagation destination is VM, and its error type is ping timeout. The direction of the relation rel06 is from the propagation source to the propagation direction. That is, it is indicated that, after a ping timeout occurs in the CI whose type is PM, which is the source of the relation rel06, a ping timeout occurs in the CI whose type is VM, which is the target of the relation rel06.

In the relation rel13, a CI serving as the propagation source is VM, and its error type is ping timeout; and a CI serving as the propagation destination is Svc, and its error type is service error. The direction of the relation rel13 is from the propagation source to the propagation direction. That is, it is indicated that, after a ping timeout occurs in the CI whose type is VM, which is the source of the relation rel13, a ping timeout occurs in the CI whose type is Svc, which is the target of the relation rel13.

In the relation rel01, a CI serving as the propagation source is VM, and its error type is ping timeout; and a CI serving as the propagation destination is PM, and its error type is ping timeout. The direction of the relation rel01 is from the propagation destination to the propagation source. That is, it is indicated that, after a ping timeout occurs in the CI whose type is PM, which is the target of the relation rel01, a ping timeout occurs in the CI whose type is VM, which is the source of the relation rel01.

The classification unit 61 performs abstraction of an extracted relation using the type of a CI serving as the propagation source, the type of its error, the type of a CI serving as the propagation destination, the type of its error, and the direction of the relation, and classifies the result as a candidate for a relation class. In the example illustrated in FIG. 9, the relation rel02 and the relation rel06 are common in all of the following: the type of a CI serving as the propagation source, the type of its error, the type of a CI serving as the propagation destination, the type of its error, and the direction of the relation. The classification unit 61 generates a candidate c01 for a relation class from information indicated in the relation rel02 and the relation rel06. Therefore, the candidate c01 for a relation class is such that the type of a CI serving as the propagation source is PM, the type of its error is ping timeout, the type of a CI serving as the propagation destination is VM, the type of its error is ping timeout, and the direction of the relation is from the propagation source to the propagation destination.

FIG. 10 is a diagram of a concrete example of a relation class candidate list generated by the classification unit 61. In the example illustrated in FIG. 10, in addition to the above-described candidate 01 for a relation class, candidates c02 to c05 are illustrated. The candidate c02 for a relation class is such that the type of a CI serving as the propagation source is VM, the type of its error is ping timeout, the type of a CI serving as the propagation destination is Svc, the type of its error is app error, and the direction of the relation is from the propagation source to the propagation destination.

The candidate c03 for a relation class is such that the type of a CI serving as the propagation source is VM, the type of its error is cpu overload, the type of a CI serving as the propagation destination is Svc, the type of its error is slowdown, and the direction of the relation is from the propagation source to the propagation destination.

The candidate c04 for a relation class is such that the type of a CI serving as the propagation source is VM, the type of its error is cpu overload, the type of a CI serving as the propagation destination is VM, the type of its error is app slowdown, and the direction of the relation is from the propagation source to the propagation destination.

The candidate c05 for a relation class is such that the type of a CI serving as the propagation source is VM, the type of its error is request burst, the type of a CI serving as the propagation destination is PM, the type of its error is nw overload, and the direction of the relation is from the propagation destination to the propagation source.

The aggregation unit 62 obtains the number of appearances of each of the candidates c01 to c05 for a relation class. In the example illustrated in FIG. 10, the number of appearances of the candidate c01 for a relation class is 10; the number of appearances of the candidate c02 for a relation class is 8; the number of appearances of the candidate c03 for a relation class is 7; the number of appearances of the candidate c04 for a relation class is 5; and the number of appearances of the candidate c05 for a relation class is 5.

The relation class determining unit 63 determines a candidate for a relation class whose number of appearances is greater than or equal to a threshold as a relation class. For example, when a threshold of the number of appearances in the example illustrated in FIG. 10 is 5, among the candidates c01 to c05 for a relation class, all are determined as relation classes c01 to c05.

FIG. 11 is a diagram illustrating the types of CIs serving as sources and targets of the determined relation classes. In the relation class c01, the type of a CI serving as a source is PM, and the type of a CI serving as a target is VM. In the relation class c02, the type of a CI serving as a source is VM, and the type of a CI serving as a target is Svc. In the relation class c03, the type of a CI serving as a source is VM, and the type of a CI serving as a target is Svc. In the relation class c04, the type of a CI serving as a source is VM, and the type of a CI serving as a target is VM. In the relation class c05, the type of a CI serving as a source is VM, and the type of a CI serving as a target is PM.

The relation class applying unit 64 applies the relation classes based on the types of CIs serving as the sources and targets of the individual relations indicated in the configuration information 21. FIG. 12 is an explanatory diagram of relations and relation classes to apply.

In the example illustrated in FIG. 12, the relation class c05 is applied to the relations rel01 and rel04. The relation class c01 is applied to the relations rel02 and rel03. The relation class c04 is applied to the relations rel19 and rel20. Both the relation classes c02 and c03 are applied to the relations rel23 and rel24.

For the individual relations, the relation class applying unit 64 adds the applied relation classes to the configuration information 21. FIG. 13 is an explanatory diagram of configuration information after the relation classes are applied. Relation classes are added to the relations in addition to the configuration information illustrated in FIG. 7. More specifically, a description, class="c05", indicating the relation class of the relation rel01 is added. A description, class="c01", indicating the relation class of the relation rel02 is added. A description, class="c02, c03", indicating the relation classes of the relation rel24 is added.

FIG. 14 is an explanatory diagram regarding a concrete example of the failure handling information 28. The failure handling information 28 indicates that the cause of a service error occurring in the CI Ta is a failure in the CI pm12, that the path from the CI Ta to the CI pm12 includes the relations rel14 and rel06, and the details of handling the failure. Similarly, the failure handling information 28 indicates that the cause of a service error occurring in the CI Tb is a failure in the CI vb02, that the path from the CI Tb to the CI bv02 includes the relation rel17, and the details of handling the failure.

The investigation detail generating unit 65 refers to the failure handling information 28 and generates the investigation details 24. Specifically, the investigation detail generating unit 65 applies a relation class (relation classes) to a path indicated in the failure handling information 28, and, among items of information indicated in the failure handling information 28, performs abstraction of a CI having an error by replacing that CI with a CI type and abstraction of a CI serving as the point of a failure causing the error by replacing that CI with a CI type.

FIG. 15 illustrates a concrete example of the investigation details 24 generated by the investigation detail generating unit 65. In the example illustrated in FIG. 15, the type of a CI where an error has occurred is Svc, and the type of a point where a failure causing the error has occurred is PM or VM. The relation classes of paths used to perform sorting when the type of a point where a failure causing the error has occurred is PM are c02+c03 to c01. The relation classes of paths used to perform sorting when the type of a point where a failure causing the error has occurred is VM are c02+c03.

With reference to the investigation details 24, if a service error occurs in a CI whose type is Svc, it is indicated that PM or VM may be the cause of the error. In addition, when the cause is PM, it is indicated that a CI causing the error may be reached by tracking relations whose relation classes are c02 and c03 and then tracking a relation whose relation class is c01. Similarly, when the cause is VM, it is indicated that a CI causing the error may be reached by tracking relations whose relation classes are c02 and c03.

FIG. 16 is an explanatory diagram of a concrete example of the error detection information 25. The error detection information 25 has a CI in which an error has occurred and the type of symptom of the error that has occurred. In the example illustrated in FIG. 16, it is indicated that a service error has occurred in the CI Ta.

Figure 17:
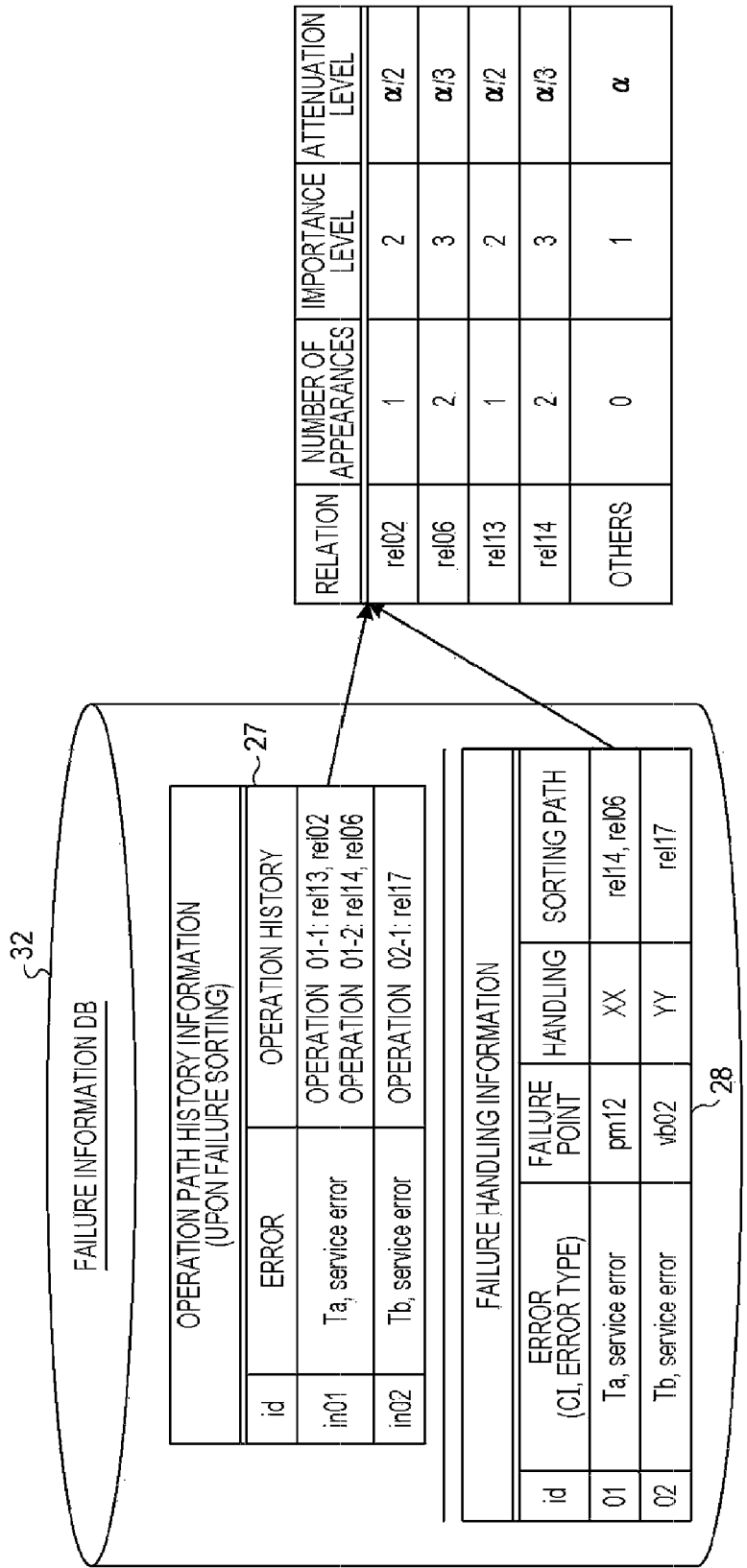
FIG. 17 is an explanatory diagram describing a failure information database (DB) and attenuation levels.

FIG. 17 is an explanatory diagram illustrating the failure information DB 32 and attenuation levels. The failure information DB 32 has the operation path history information 27 and the failure handling information 28. The operation path history information 27 describes that, when a service error occurs in the CI Ta, the point of a failure is investigated by tracking the relation rel13 and the relation rel02 in a first operation 01-1, and by tracking the relation rel14 and the relation rel06 in the next operation 01-2. The operation path history information 27 describes that, when a service error occurs in the CI Tb, the point of a failure is investigated by tracking the relation rel17 in operation 02-1. The operation may include manual investigation performed by an operator or a tracking operation performed in the past by the failure point estimating apparatus 30.

The failure handling information 28 indicates, as has been described above, that the cause of the service error occurring in the CI Ta is the failure in the CI pm12, that the paths from the CI Ta to the CI pm12 are the relations rel14 and rel06, and the details of the handling of the failure. In the same manner, the failure handling information 28 describes that the cause of the service error occurring in the CI Tb is the failure in the CI vb02, that the path from the CI Tb to the CI vb02 is the relation rel17, and the details of the handling of the failure.

The investigation range limiting unit 12 uses the failure information DB 32 to determine the range of relations to be tracked for generating investigation-range-limited trees. The failure point estimating apparatus 30 predetermines a certain hop value and decrements the hop value every time a relation is tracked. Then, the failure location estimating apparatus 30 tracks relations within the range where the hop value becomes less than or equal to 0 and generates investigation-range-limited trees. A value subtracted from the hop value when a relation is tracked is referred to as an "attenuation level".

The investigation range limiting unit 12 defines a lower attenuation level for a relation registered in the failure information DB 32. By changing the attenuation level with reference to the histories, investigation-range-limited trees can be obtained which predominantly track the range investigated in the past and/or the vicinity of the failure having caused an error in the past.

With reference to FIG. 17, the calculation of an attenuation level for a service error in the Ta will be described. The investigation range limiting unit 12 counts the relations registered in the operation path history information 27 and the failure handling information 28 for a service error in the Ta. The operation path history information 27 and the failure handling information 28 have one appearance of the relation rel02, two appearances of the relation rel06, one appearance of the relation rel13, and two appearances of the relation rel14. The numbers of appearances of the other relations are zero.

The investigation range limiting unit 12 obtains an importance level by adding 1 to the number of appearances of each relation. As a result, the relation rel02 has the importance level 2; the relation rel06 has the importance level 3; the relation rel13 has the importance level 2; the relation rel14 has the importance level 3; and the other relations have the importance level 1.

The investigation range limiting unit 12 defines the attenuation levels of the other relations, that is, relations that are not registered with corresponding errors in the failure information DB 32, as $\alpha$, and the value obtained by dividing $\alpha$ by an importance level as the attenuation level of each of the relations. As a result, the relation rel02 has the attenuation level $\alpha/2$; the relation rel06 has the attenuation level $\alpha/3$; the relation rel13 has the attenuation level $\alpha/2$; and the relation rel14 has the attenuation level $\alpha/3$.

Figure 18:
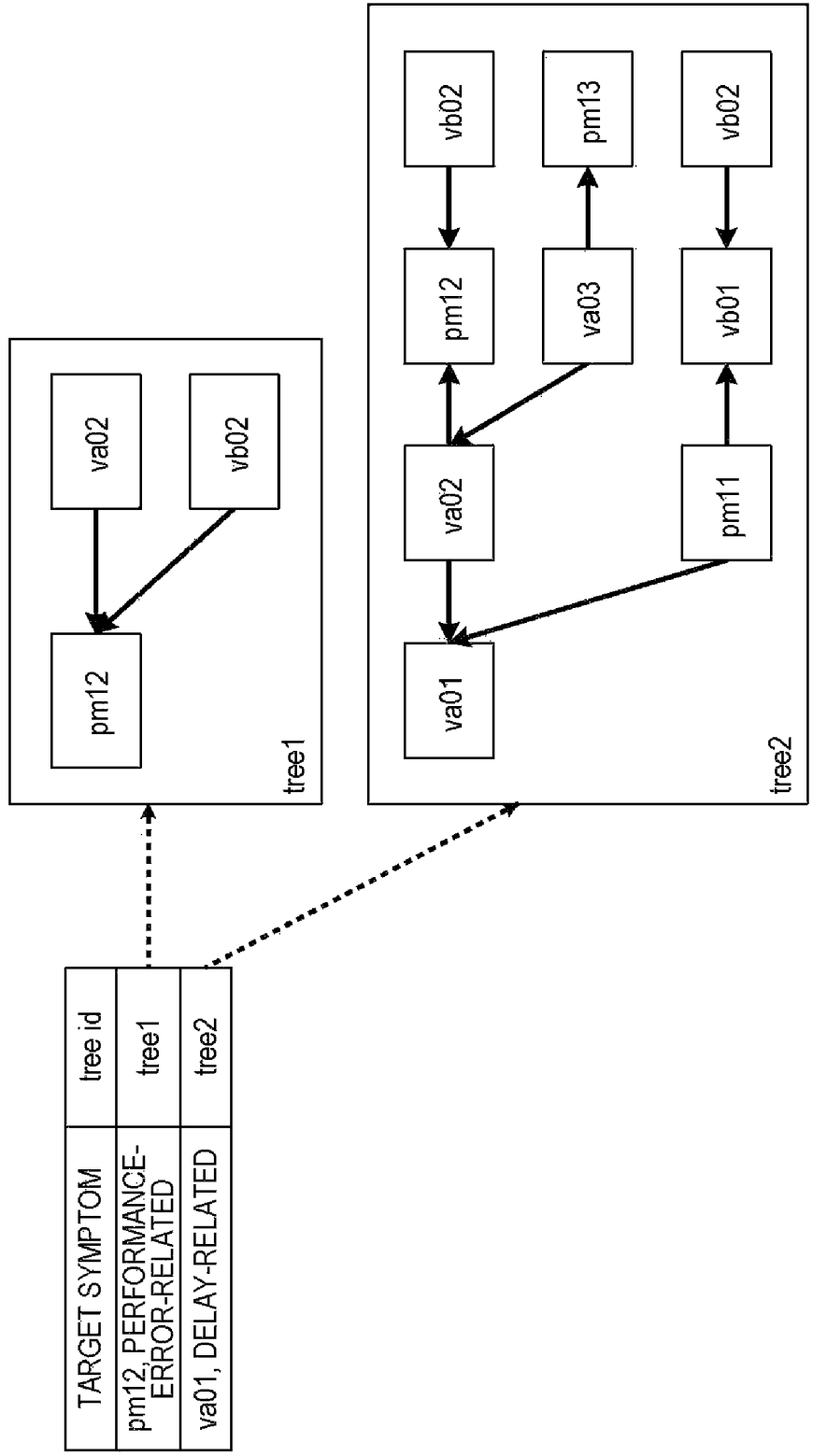
FIG. 18 is an explanatory diagram of investigation-range-limited trees generated by an investigation range limiting unit.

FIG. 18 is an explanatory diagram of investigation-range-limited trees generated by the investigation range limiting unit 12. The investigation range limiting unit 12 generates an investigation-range-limited tree for each detected error. In the example illustrated in FIG. 18, the investigation range limiting unit 12 generates an investigation-range-limited tree tree1 for a performance error detected in the CI pm12 and generates an investigation-range-limited tree tree2 for a delay detected in the CI va01.

The investigation-range-limited tree tree1 has a root in the CI pm12 and the CI va02 and the CI vb02 as nodes connecting to the root. The investigation-range-limited tree tree2 has a root in the CI va01 and the CI va02 and the CI pm12 as nodes connecting to the root. The investigation-range-limited tree tree2 further has the CI pm12 and the CI va03 as nodes connecting to the CI va02. The investigation-range-limited tree tree2 has the CI vb02 as a node connecting to the CI pm12 and the CI pm13 as a node connecting to the CI va03. In addition, the investigation-range-limited tree tree2 has the CI vb01 as a node connecting to the CI pm11 and the CI vb02 as a node connecting to the CI vb01.

Figure 19:
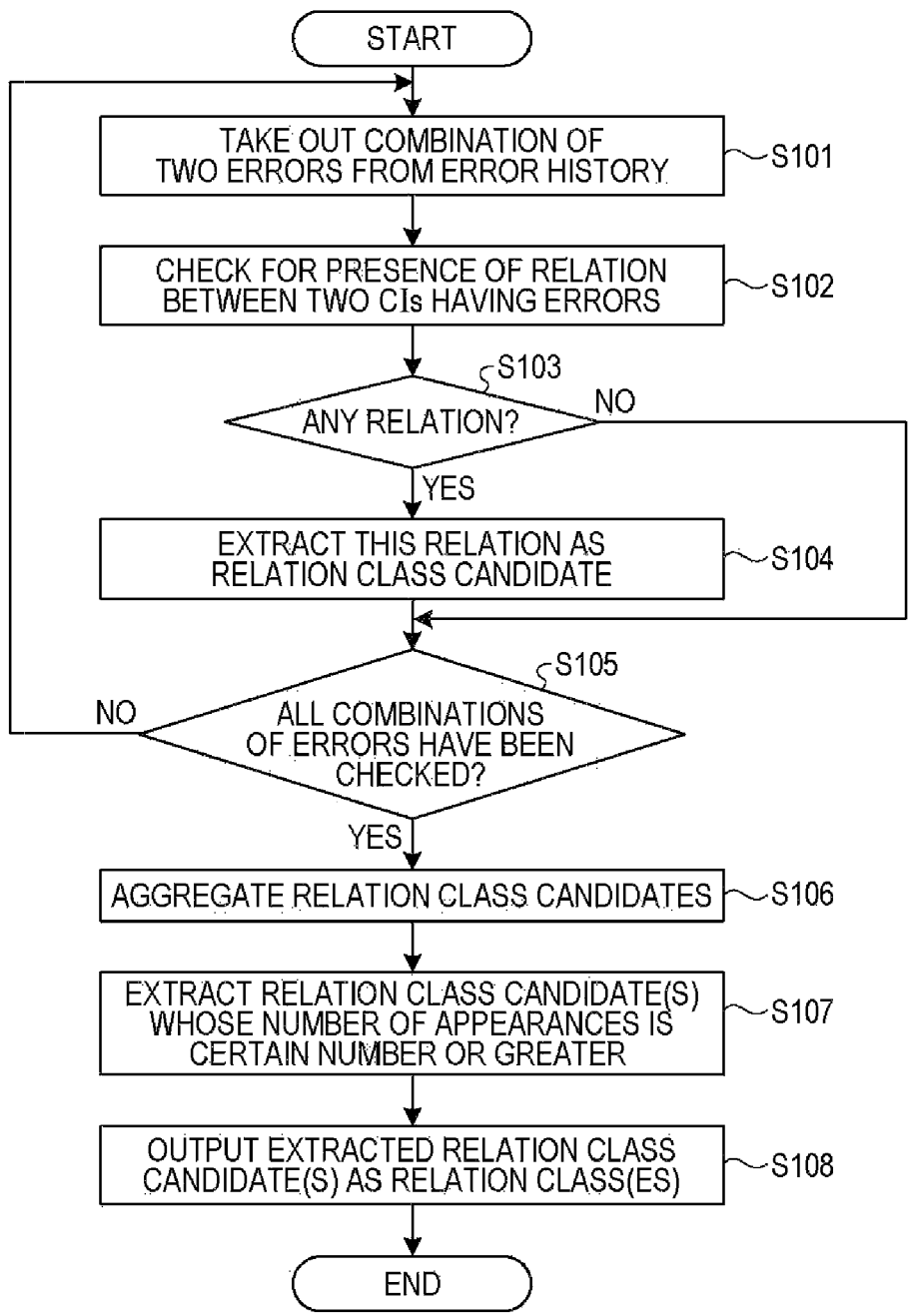
FIG. 19 is a flowchart describing generation of a relation class.

FIG. 19 is a flowchart describing generation of a relation class. The classification unit 61 in the network management information generating apparatus 70 extracts a combination of two errors from the error history 51 held in the failure information DB 32 (S101). The classification unit 61 refers to the configuration information 21 held in the CMDB 31, and, for the extracted two errors, checks for the presence of a relation between CIs having the errors (S102). When there is a relation (YES in S103), the classification unit 61 extracts this relation as a candidate for a relation class (S104).

After S104 or when there is no relation (NO in S103), the classification unit 61 determines whether all combinations of errors have been checked (S105). When there remains a combination of errors that have not been checked (NO in S105), the classification unit 61 returns to step S101.

When all combinations of errors have been checked (YES in S105), the aggregation unit 62 aggregates the candidates for a relation class (S106). As a result of the aggregation, the relation class determining unit 63 extracts a relation class candidate(s) whose number of appearances is a certain number or greater (S107), and outputs the extracted relation class candidate(s) (S108). The process is terminated.

Figure 20:
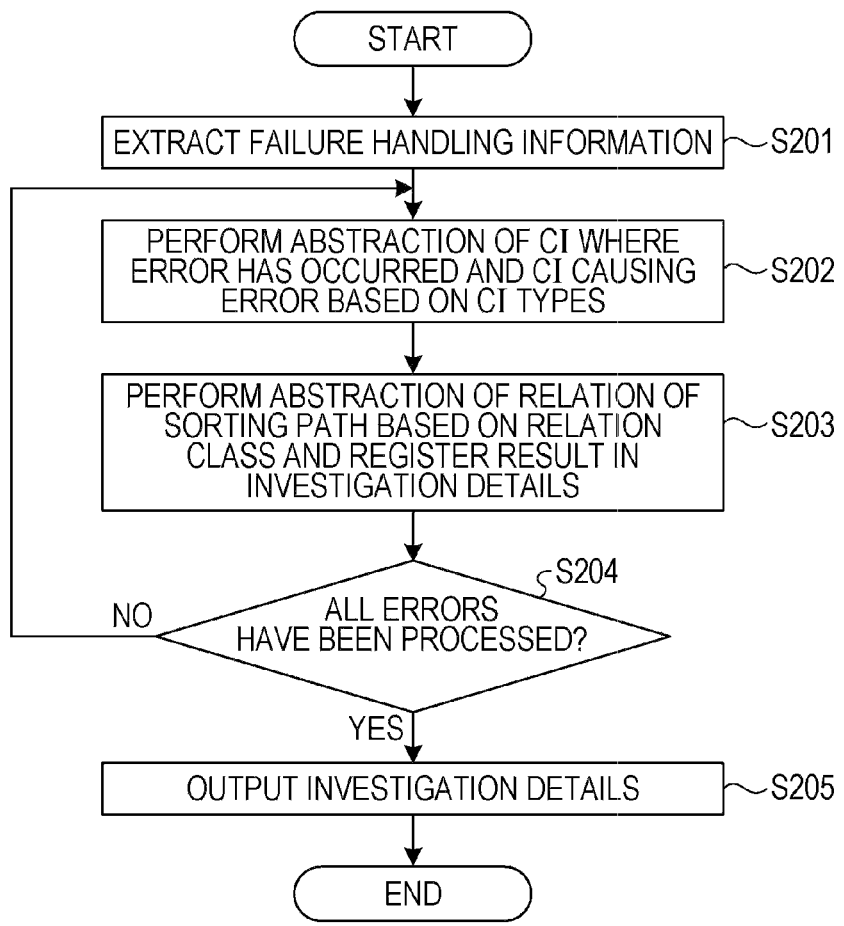
FIG. 20 is a flowchart describing generation of investigation details.

FIG. 20 is a flowchart describing generation of investigation details. The investigation detail generating unit 65 in the network management information generating apparatus 70 extracts the failure handling information 28 from the failure information DB 32 (S201). The investigation detail generating unit 65 performs abstraction of a CI in which an error has occurred and a CI causing the error, which are indicated in the failure handling information 28, based on the types of the CIs (S202). The investigation detail generating unit 65 performs abstraction of a relation included in a sorting path, which is indicated in the failure handling information 28, based on a relation class, and registers the result as investigation details (S203).

The investigation detail generating unit 65 determines whether all errors indicated in the failure handling information 28 have been processed (S204). When there remains an error that has not been processed (NO in S204), the investigation detail generating unit 65 returns to step S202. When all the errors have been processed (YES in S204), the investigation detail generating unit 65 outputs the investigation details (S205). The process is terminated.

As has been described above, the network management supporting system, the network management supporting apparatus, and the network management supporting method according to the second embodiment generate a relation class that is abstraction of the propagating direction of an error, based on the types of components, from configuration information of a network and error history information. In addition, the disclosed system, apparatus, and method classify the relation between components of the system into a relation class, and, when an error occurs, based on relation classes, narrows down the range in which a failure causing the error has occurred by tracking the components.

Narrowing down the possible points of a failure by using relation classes in this manner does not depend on the configuration of the network system and is thus highly versatile. Therefore, such a technique is applicable to a newly constructed network system or even to a network system having a changed configuration.

Even for trouble investigation in a large-scale network system or a virtual environment, the disclosed art may support the trouble investigation by narrowing down the possible points of a failure.

More specifically, the disclosed art is applicable to a virtual network including, as components, physical machines, virtual machines, and services. By applying relation classes to an error handling history in the past, the range to be tracked when an error occurs may be obtained as an investigation range. In this way, propagation of the error may be tracked without depending on the actual configuration, and the point of a failure may be estimated.

The system, apparatus, and method disclosed in the embodiments are only examples, and the configurations and operations may be changed properly for implementation. For example, the apparatus disclosed in the second embodiment may have the relation class applying unit 11, the investigation range limiting unit 12, and the failure point candidate estimating unit 13 distributed over a network system and may be implemented as a failure point estimation system.

The network management information generating apparatus 70, the failure point estimating apparatus 30, the CMDB 31, and the failure information DB 32 may be implemented as an apparatus including these elements enclosed in a single housing. The CMDB 31 and the failure information DB 32 may be shared with other apparatuses or systems. The processes on the flowcharts disclosed in the second embodiment may be added and/or deleted, or the order of the processes may be changed properly.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment of the present invention has been described in detail, it should be understood that the various changes, substitutions, and alterations could be made hereto without departing from the spirit and scope of the invention.

What is claimed is:

1. An apparatus for managing a network system including a plurality of components, the apparatus comprising:
   a memory that stores:
      component type data of each component of the plurality of components,
      component relation data including relation information indicating a pair of components related to each other in the network system, the relation information including a first component type data of a first component requesting a process of the component and a second component type data of a second component accepting a request of the process requested by the first component, and
      error history data indicating error information of the plurality of components; and
   a processor coupled to the memory and which is configured to:
      extract candidates of a relation class indicating a propagating direction of an error between components, based on the component type data, component relation data, and the error history data,
      determine the relation class among the candidates based on the first component type data and the second component type data,
      determine an investigation range by predetermining a specified hop value and decrementing the hop value every time the relation class is tracked, and
      estimate a point where a failure causing the error has occurred by tracking the relation class within the investigation range.

2. The apparatus according to claim 1, wherein the processor is configured to count, for each combination of the pair of component type data, an appearance number of the candidates including the identical combination of the pair of component type data to the each combination; and
   wherein the determine the relation class includes determining the relation class from among the candidates on the basis of the counted appearance numbers.

3. The apparatus according to claim 1, wherein the network system is a virtual network system and the each of the plurality of components is a physical machine, a virtual machine or a service.

4. A method of managing a network system including a plurality of components, the method comprising:
   obtaining component type data of each component of the plurality of components, component relation data including relation information indicating a pair of components related to each other in the network system, the relation information including a first component type data of a first component requesting a process of the component and a second component type data of a second component accepting a request of the process requested by the first component, and error history data indicating error information of the plurality of components,
   extracting, by the processor, candidates of a relation class indicating a propagating direction of an error between components, based on the component toe data, component relation data and the error history data,
   determining, by the processor, the relation class among the candidates based on the first component type data and the second component type data, determining, by the processor, an investigation range by predetermining a specified hop value and decrementing the hop value every time the relation class is tracked, and estimating, by a processor, a point where a failure causing the error has occurred by tracking the relation class within the investigation range.

5. The method according to claim 4, further comprising:

counting, for each combination of the pair of component type data, an appearance number of the relation class candidates including the identical combination of the pair of component type data to the each combination; wherein the determining of the relation class includes determining the relation class from among the candidates on the basis of the counted appearance numbers.

6. The method according to claim 4, wherein the error information includes a timestamp, a time period between times indicated by timestamps in the error information of the pair of error components is less than a predetermined time.

7. The method according to claim 4, further comprising:

generating investigation information that specifies failure component type data on the basis of the component type data of the pair of error components, the relation information related to the pair of the error components, the error history information related to the pair of the error components and a history of previous investigations including component type data of a previous error component and a previous failure component causing a previous error of the previous error component, the investigation information corresponding to the relation class including a pair of the first component type data and the second component type data.

8. The method according to claim 4, further comprising:

the estimating of the point includes selecting a component on the basis of an appearance frequency of each of the plurality of components in the investigation range.

9. A computer-readable, non-transitory medium storing a program for managing a network system including a plurality of components, the program causing a computer to execute a procedure, the procedure comprising:

obtaining component type data of each component of the plurality of components, component relation data including relation information indicating a pair of components related to each other in the network system, the relation information including a first component type data of a first component requesting a process of the component and a second component type data of a second component accepting a request of the process requested by the first component, and error history data indicating error information of the plurality of components, extracting candidates of a relation class indicating a propagating direction of an error between components, based on the component type data, component relation data and the error history data, determining the relation class among the candidates based on the first component type data and the second component type data, determining an investigation range by predetermining a specified hop value and decrementing the hop value every time the relation class is tracked, and estimating a point where a failure causing the error has occurred by tracking the relation class within the investigation range.

10. The computer-readable, non-transitory medium according to claim 9, wherein the procedure further comprises counting, for each combination of the pair of component type data, an appearance number of the relation class candidates including the identical combination of the pair of component type data to the each combination;

wherein the determining the relation class includes determining the relation class from among the candidates on the basis of the counted appearance numbers.

11. The computer-readable, non-transitory medium according to claim 9, wherein the error information includes a timestamp, and a time period between times indicated by timestamps in the error information of the pair of error components is less than a predetermined time.

12. The computer-readable, non-transitory medium according to claim 9, wherein the procedure further includes generating investigation information that specifies failure component type data on the basis of the component type data of the pair of error components, the relation information related to the pair of the error components, the error history information related to the pair of the error components and a history of previous investigations including component type data of a previous error component and a previous failure component causing a previous error of the previous error component, the investigation information corresponding to the relation class including a pair of the first component type data and the second component type data.

13. The computer-readable, non-transitory medium according to claim 9, wherein the estimating the point includes selecting a component on the basis of an appearance frequency of each of the plurality of components in the investigation range.

* * * * *